US011629717B2

(12) United States Patent
Reuter et al.

(10) Patent No.: US 11,629,717 B2
(45) Date of Patent: Apr. 18, 2023

(54) SIMULTANEOUSLY PUMPING AND MEASURING DENSITY OF AIRCRAFT FUEL (71) Applicant: Hamilton Sundstrand Corporation, Charlotte, NC (US)

(72) Inventors: Charles E. Reuter, Granby, CT (US); Gerald P. Dyer, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 610 days.

(21) Appl. No.: 16/678,920

(22) Filed: Nov. 8, 2019

(65) Prior Publication Data

US 2021/0140432 A1 May 13, 2021

(51) Int. Cl.
*G01N 9/30* (2006.01)
*F04D 1/00* (2006.01)
*G01N 9/26* (2006.01)
*G01N 9/32* (2006.01)

(52) U.S. Cl.
CPC .................. *F04D 1/00* (2013.01); *G01N 9/26* (2013.01); *G01N 9/30* (2013.01); *G01N 9/32* (2013.01)

(58) Field of Classification Search
CPC .............. G01N 9/26; G01N 9/30; G01N 9/32
USPC ........ 60/243; 73/32 R, 438, 114.43; 702/137
See application file for complete search history.

(56) References Cited

U.S. PATENT DOCUMENTS 4,429,528 A 2/1984 Matthews et al.
4,508,127 A 4/1985 Thurston
5,138,559 A 8/1992 Kuehl et al.
9,091,217 B2 7/2015 Hodinot et al.
2009/0280366 A1 11/2009 Baaser et al.
(Continued)

FOREIGN PATENT DOCUMENTS

CA 3069609 A1 1/2019
EP 3219841 A1 9/2017
(Continued)

OTHER PUBLICATIONS

Extended European Search Report dated Mar. 18, 2021, received for corresponding European Application No. 20206457.2, 8 pages.
(Continued)

*Primary Examiner* — Robert R Raevis
(74) *Attorney, Agent, or Firm* — Kinney & Lange, P.A.

(57) ABSTRACT

Apparatus and associated methods relate to simultaneously pumping and measuring density of an aircraft fuel. The aircraft fuel is pumped by a centrifugal pump having an impeller. A rotational frequency of the impeller is determined while the centrifugal pump is pumping the aircraft fuel. Flow rate of the aircraft fuel through the centrifugal pump is sensed. Pressure of the aircraft fuel is measured at two different points within or across the centrifugal pump or a differential pressure is measured between the two different points while the centrifugal pump is pumping the aircraft fuel. Density of the aircraft fuel is determined based on an empirically-determined head-curve relation corresponding to the centrifugal pump. The head-curve relation is empirically determined during a characterization phase. The empirically-determined head-curve relation relates the density of the aircraft fuel to the rotational frequency, the flow rate, and the pressures at the two different points.

19 Claims, 6 Drawing Sheets

(56) References Cited

U.S. PATENT DOCUMENTS

| | | | |
|---|---|---|---|
| 2012/0042657 A1* | 2/2012 | Hodinot | F02C 7/232 |
| | | | 60/734 |
| 2012/0166110 A1 | 6/2012 | Wilson | |
| 2017/0167391 A1 | 6/2017 | Demelas | |
| 2017/0184111 A1 | 6/2017 | Brookes et al. | |
| 2018/0149107 A1* | 5/2018 | Morris | F02D 35/027 |
| 2019/0094055 A1 | 3/2019 | Dale | |

FOREIGN PATENT DOCUMENTS

| | | |
|---|---|---|
| EP | 3812592 A1 | 4/2021 |
| WO | 9724596 A1 | 7/1997 |

OTHER PUBLICATIONS

Communication pursuant to Article 94(3) EPC for European Patent Application No. 20206457.2, dated Dec. 12, 2022, 8 pages.

\* cited by examiner

SIMULTANEOUSLY PUMPING AND MEASURING DENSITY OF AIRCRAFT FUEL

CROSS-REFERENCE TO RELATED APPLICATION(S)

This application is related to U.S. Non-Provisional application Ser. No. 16/659,150 filed Oct. 21, 2019, for "Measuring Density of Aircraft Fuel Using a Centrifugal Fluid Pump," by Gerald P. Dyer and Charles E. Reuter, the entire disclosure of which is hereby incorporated by reference.

BACKGROUND

Fuel metering of an aircraft involves measurement of fuel density, which can change in response to changes in conditions. Temperature, for example, affects the density of fuels used in aircraft engines. The amount of energy contained in a particular volume of fuel is dependent on the density of the fuel. Thus, aircraft fuel systems measure density of the fuel so that accurate metering of fuel to the engines can be performed. Temperature variations, pressure variations and vibrations that are experienced on an aircraft in flight can make accurate measurements of fuel density difficult.

SUMMARY

Some embodiments relate to a system for simultaneously pumping and measuring density of an aircraft fuel. The system includes a centrifugal pump including an impeller configured to pump the aircraft fuel. The system includes a speed sensing arrangement configured to determine a rotational frequency of the impeller while the centrifugal pump is pumping the aircraft fuel. The system includes a flow-rate sensing arrangement configured to measure flow rate of the aircraft fuel through the centrifugal pump. The system includes a pressure sensing arrangement configured to measure pressure at two different points within or across the centrifugal pump or a differential pressure between the two different points while the centrifugal pump is pumping the aircraft fuel. The system includes one or more processors. The system also includes computer-readable memory containing data indicative of a empirically-determined head-curve relation corresponding to the centrifugal pump and determined during a characterization phase. The head-curve relation defines a relation between density of the aircraft fuel and flow rate, speed, and either the pressures of the two different points or the differential pressure between the two different points. The computer-readable memory further containing instructions that, when executed by the one or more processors, cause the system to calculate, using the empirically-determined head-curve relation during an operation phase, a density of the aircraft fuel based on the rotational frequency, the flow rate, and either the pressures of the two different points or the differential pressure between the two different points.

Some embodiments relate to a method for simultaneously pumping and measuring density of aircraft fuel. The method includes empirically determining, during a characterization phase, a head-curve relation that characterizes a centrifugal pump. The empirically determined head-curve relation relates density of the aircraft fuel to flow rate of the aircraft fuel, pressure of the aircraft fuel as sensed at two different points within or across the centrifugal pump, and rotational frequency of an impeller of the centrifugal pump. The method includes storing data indicative of the head-curve relation empirically determined. The method includes pumping, during an operational phase, the aircraft fuel with the centrifugal pump. The method includes measuring, during the operational phase, the flow rate of the aircraft fuel pumped by the centrifugal pump. The method includes measuring, during the operational phase, pressure at the two different points or a differential pressure between the two different points. The method includes measuring during the operational phase, a rotational frequency of the impeller of the centrifugal pump. The method includes retrieving, from computer-readable memory, the data indicative of the empirically-determined head-curve relation. The method also includes calculating during the operational phase, a density of the aircraft fuel based on the rotational frequency, the flow rate, and the pressures of the two different points or the differential pressure between the two different points.

DETAILED DESCRIPTION

Apparatus and associated methods relate to simultaneously pumping and measuring density of an aircraft fuel. The aircraft fuel is pumped by a centrifugal pump having an impeller. A rotational frequency of the impeller is determined while the centrifugal pump is pumping the aircraft fuel. Flow rate of the aircraft fuel through the centrifugal pump is sensed. Pressure of the aircraft fuel is measured at two different points within or across the centrifugal pump or a differential pressure is measured between the two different points while the centrifugal pump is pumping the aircraft fuel. Density of the aircraft fuel is determined based on an empirically-determined head-curve relation corresponding to the centrifugal pump. The head-curve relation is empirically determined during a characterization phase. The empirically-determined head-curve relation relates the density of the aircraft fuel to the rotational frequency, the flow rate, and the pressures at the two different points.

Figure 1:
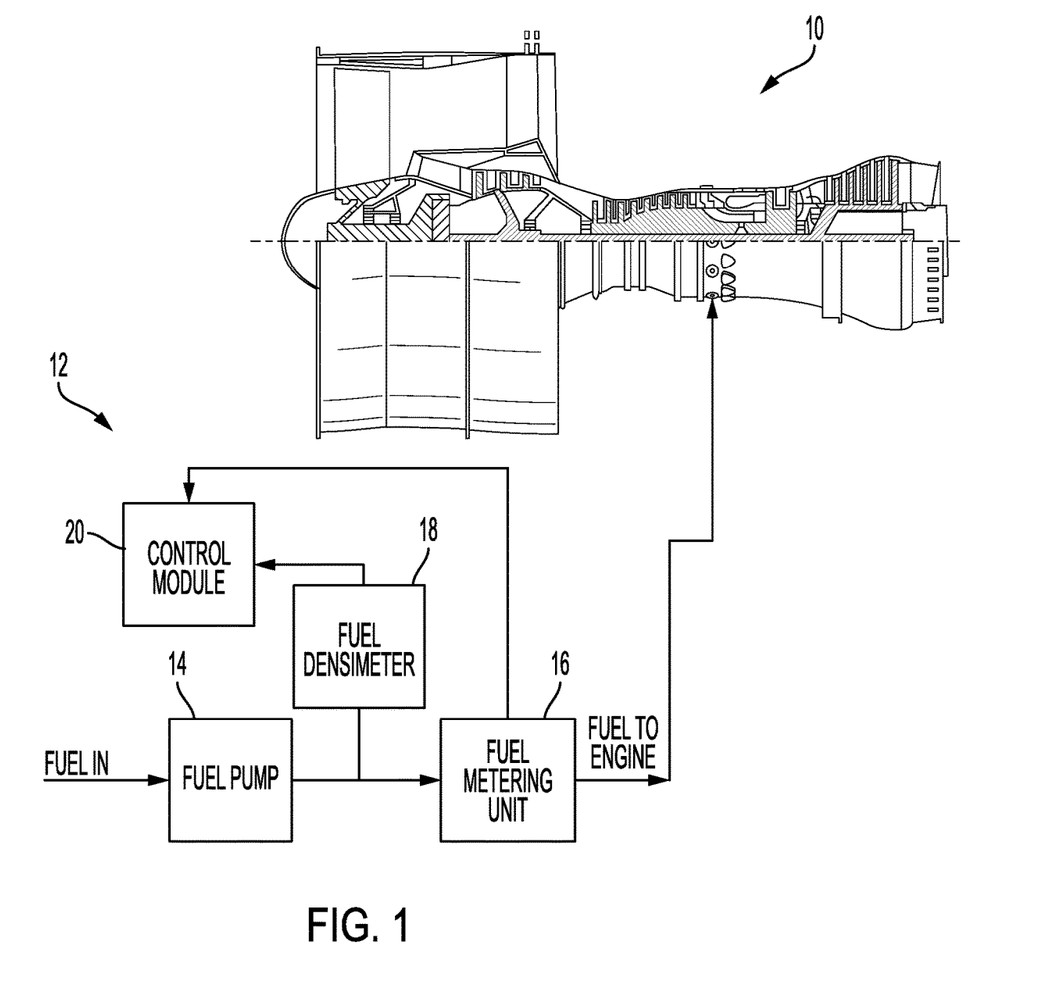
FIG. 1 is a schematic view of an aircraft engine supplied with fuel by a fuel system that simultaneously pumps and measures density of aircraft fuel using a single impeller.

FIG. 1 is a schematic view of an aircraft engine configured to be supplied with aircraft fuel by a fuel system. In FIG. 1, aircraft engine 10 includes fuel system 12. Fuel system 12 includes fuel pump 14, fuel metering unit 16, Fuel densimeter 18, and fuel control module 20.

Fuel pump 14 receives fuel from a fuel inlet port connected to a fuel line and pumps the received fuel to an outlet port. Fuel densimeter 18 receives the fuel from the outlet port of fuel pump 14, measures the density of the fuel, and provides fuel control module 20 a signal indicative of the measured density of the fuel. Fuel control module 20 controls the fuel metering unit 16, based at least in part on the measured density of the fuel. Fuel metering unit 16 then meters the fuel provided to aircraft engine 10 as controlled by fuel control module 20. Fuel densimeter includes a centrifugal pump and pressure sensors configured to measure fluid pressure at various radial distances from an impeller axis.

Figure 2:
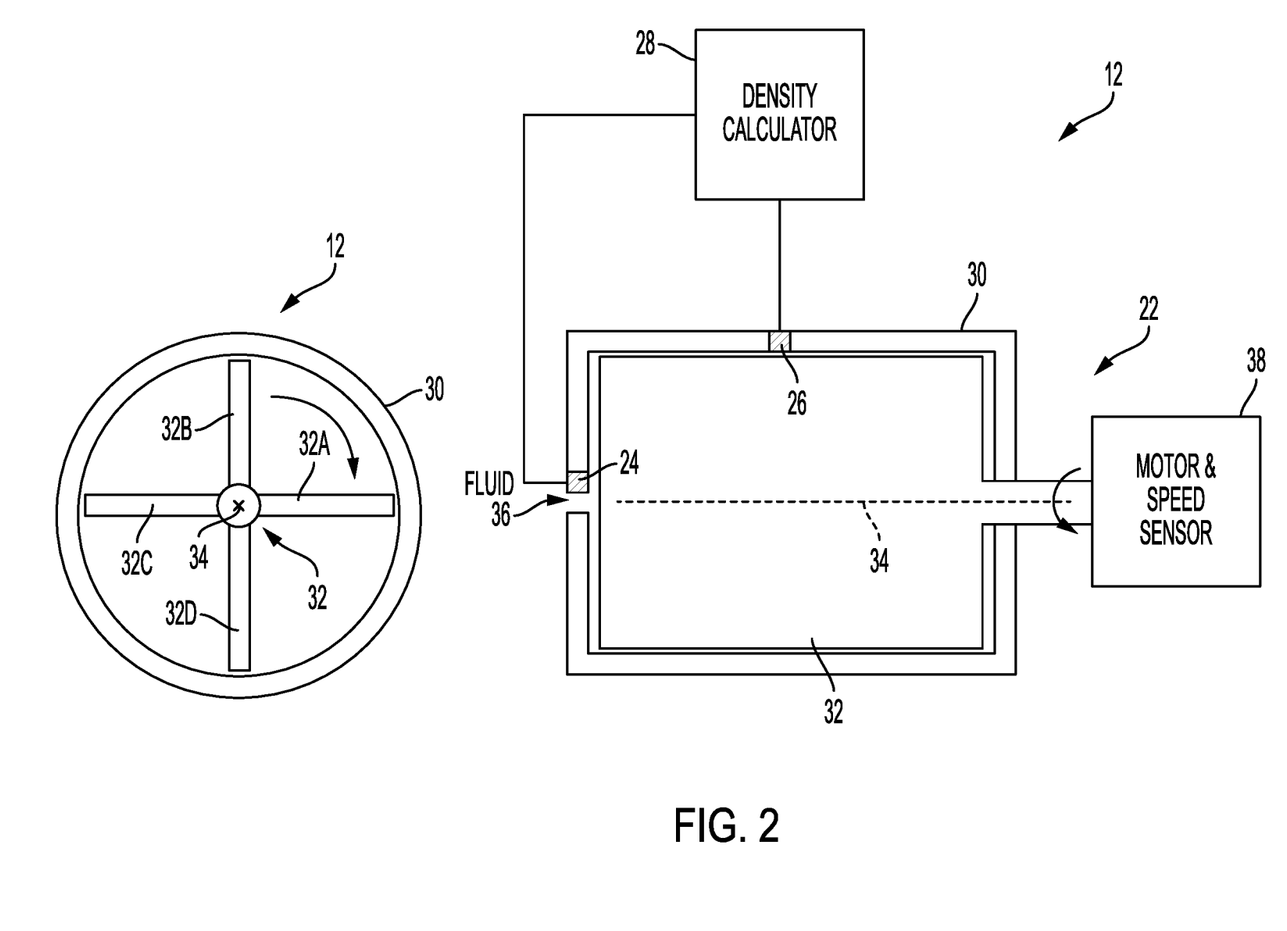
FIG. 2 shows cross-sectional views of a fuel system that simultaneously pumps and measures density of aircraft fuel using a single impeller.

FIG. 2 shows cross-sectional views of a densimeter that measures density of aircraft fuel. In FIG. 2, densimeter 12 includes centrifugal pump 22, first and second pressure sensors 24 and 26, and fuel density calculator 28. Centrifugal pump 22 has pump casing 30 in which resides impeller 32. Pump casing 30 has fuel inlet 36 through which the aircraft fuel is drawn. In some embodiments, pump casing 30 has a fuel outlet through which the aircraft fuel is pumped. The fuel outlet can be used to facilitate circulation of fuel through pump casing 30. Impeller 32 is configured to rotate about impeller axis 34. Impeller 32 has a plurality of blades 32A-32D. Impeller 32, when rotated, causes the aircraft fuel to be circularly rotated within pump casing 30, thereby creating a pressure differential between fuel located near impeller axis 34 and fuel located at a radial periphery of pump casing 30. Impeller 32, when rotated, causes a pressure difference between a first fuel pressure at a first radial distance from the impeller axis 34 and a second fuel pressure at a second radial distance from the impeller axis 34.

First pressure sensor 24 is configured to measure the first fuel pressure, and second pressure sensor 26 is configured to measure the second fuel pressure. Second pressure sensor 24 is further configured to measure second fuel pressure in a radial direction at the pump casing. Density calculator 28 configured to calculate density of the aircraft fuel based on the first and second fuel pressures as measured by first and second pressure sensors 24 and 26.

Densimeter is also depicted in FIG. 2 as having motor and speed sensor 38. In some embodiments, motor and speed sensor 38 can be electrically coupled to densimeter calculator 28, so that densimeter calculator 28 can control the rotational speed of impeller 32.

Centrifugal pump 22 has pump casing 30 in which resides impeller 32. Pump casing 30 has fuel inlet 36 through which the aircraft fuel is drawn and, in some embodiments, a fuel outlet through which the aircraft fuel is pumped. In the depicted embodiment, fuel inlet 36 is aligned near or along impeller axis 34. The fuel outlet, if present, is at a radially distal location of pump casing 30 as measured from impeller axis 34. Impeller 32 is configured to rotate about impeller axis 34. Impeller 32 has a plurality of blades 32A-32D. Impeller 32, when rotated, causes the aircraft fuel to be drawn from fuel inlet 36 and to be expelled through the fuel outlet, if so equipped. Impeller 32, when rotated, also causes a pressure difference between first fuel pressure $P_1$ at a first radial distance $r_1$ from the impeller axis 34 and second fuel pressure $P_2$ at a second radial distance $r_2$ from the impeller axis 34.

As the impeller is rotated, a centrifugal pump imparts a rotational or circumferential component R to flow of the aircraft fuel being pumped. Because of this rotational component, a radial pressure gradient of the pumped fuel is produced. This radial pressure gradient varies for aircraft fuels of different densities. Therefore, such a pressure gradient can be indicative of the density of the aircraft fuel. For systems in which the first fuel pressure is measured along impeller axis 34 (i.e, the radial distance of first pressure sensor 24 from impeller axis 34 is zero: $r_1=0$), such a relation between density D and measured pressures can be given by:

$$D = \frac{2(P_2 - P_1)}{r_2^2 \omega^2}. \tag{1}$$

Here, $P_1$ is the first fuel pressure, $P_2$ is the second fuel pressure, $r_2$ is the radial distance of second pressure sensor 26 from impeller axis 34, and w is the rotation frequency of aircraft fuel. The rotational frequency of the aircraft fuel can measured and/or calculated based on a rotational frequency of the impeller as measured by motor and speed sensor 38. In some embodiments, a relation between the rotational frequency of the impeller and the rotational frequency of the aircraft fuel can be based on aircraft fuel dynamics. In some embodiments, the aircraft fuel dynamics of the system are such that the rotational frequency of the impeller and the rotational frequency of the aircraft fuel are substantially equal to one another.

Various embodiments have first and second pressure sensors 24 and 26 located at various radial distances $r_1$ and $r_2$ from impeller axis 34. For example a ratio of the distance $r_1$ to distance $r_2$ can be less than 0.25. 0.1, 0.05, or it can be 0.00 when first pressure sensor 24 is aligned along impeller axis 34.

In the embodiment in FIG. 2, centrifugal pump 22 is a zero flow pump, having no fuel outlet. For such a zero flow pump, the impeller can be designed to direct the fluid in purely circumferential directions about impeller axis 34. Such circumferential directed impellers can also be used for pumps designed for small flow rates—flow rates that corresponding to operation near zero flow rate as described above. The impeller of such a zero flow pump can have substantial axial mirror symmetry, thereby having to axial direction that is preferential.

In the embodiment depicted in FIG. 2, impeller 32 is an open vane impeller. An open vane impeller has blades, such as blades 32A-32D extending from a central hub. In some embodiments, impeller 32 can be a semi-open vane impeller. A semi-open vane impeller has a plate, which in some embodiments can be substantially circular, affixed to one axial side of impeller blades 32A-32D. In some embodiments, impeller 32 can be a closed vane impeller, which has plates on both axial sides of impeller blades 32A-32D.

First pressure sensor 24 is configured to measure the first fuel pressure, and second pressure sensor 26 is configured to measure the second fuel pressure. Second pressure sensor 26 is further configured to measure second fuel pressure in a radial direction at the pump casing. Such a radial directive sensor can have a sensing membrane that has a normal vector aligned with a radial direction from the impeller axis. For example, the radial directive sensor can have a sensing membrane that is substantially conformal with an inside surface of pump casing 22. Such a sensing membrane can deflect, in response to aircraft fuel pressure, in the radial direction that is parallel to the normal vector of the membrane. Fuel control module 20 can be configured to calculate density of the aircraft fuel based on the first and second fuel pressures as measured by first and second pressure sensors 24 and 26.

In some embodiments, instead of first and second pressure sensors 24 and 26, a differential pressure sensor measure a differential pressure between two different radial locations $r_1$ and $r_2$ from impeller axis 34. For example, instead of pressures sensors 24 and 26 at the radial locations $r_1$ and $r_2$ from impeller axis 34, a differential pressure sensor can be in fluid communication with ports located where pressures sensors 24 and 26 are depicted in FIG. 2.

Figure 3:
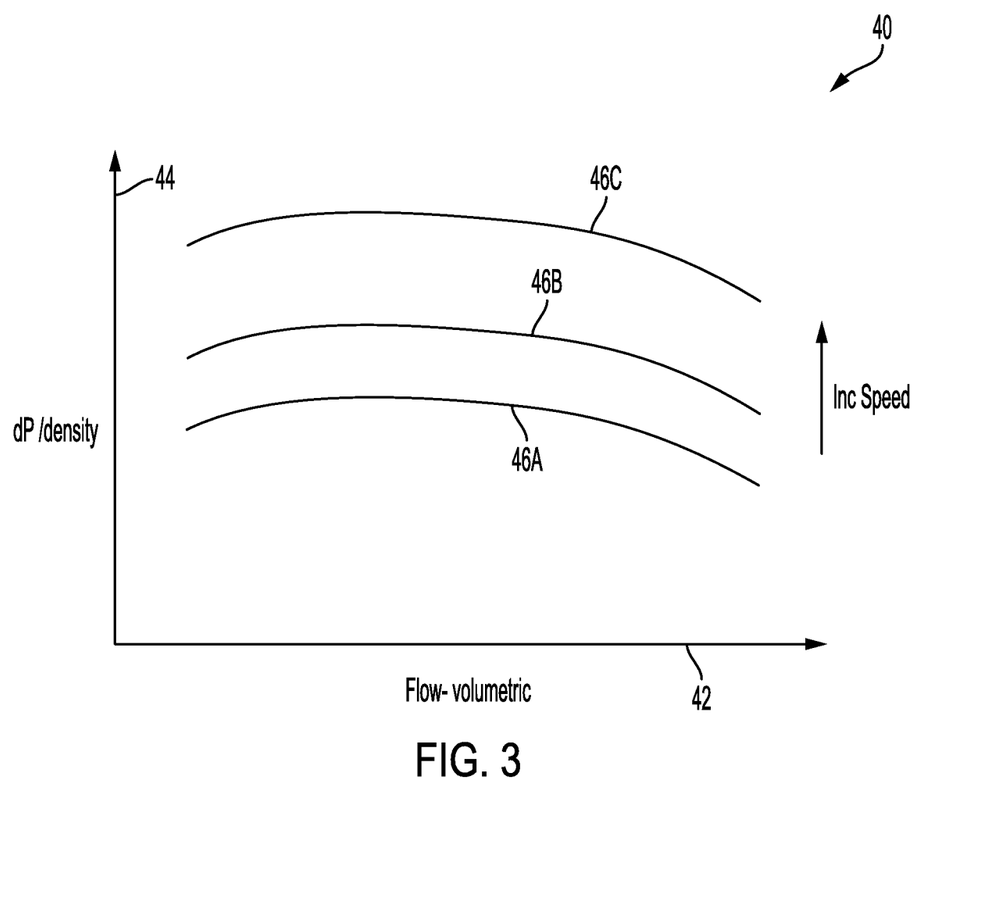
FIG. 3 is a graph depicting a relation between measured differential pressure and fluid flow and/or pump speed.

FIG. 3 is a graph depicting a relation between measured differential pressure and fluid flow and/or pump speed. In FIG. 3, graph 40 includes horizontal axis 42, vertical axis 44 and relations 46A, 46B, and 46C. Horizontal axis 42 is indicative of volumetric flow of a fluid being pumped by a centrifugal pump, such as centrifugal pump 22 depicted in FIG. 2. Vertical axis 44 is indicative of measured differential pressure of the fluid being pumped by the centrifugal pump (for a given fluid density). Relations 46A-46C are indicative of relationship s between the measured differential pressure and the volumetric flow of the pumped fluid for different rotational speeds of the pump impeller, such as impeller 32 depicted in FIG. 2.

As depicted in FIG. 3, for a given rotational speed, the measured pressure differential is not constant. For embodiments in which no fluid flow is caused by rotation of impeller 32 (e.g., embodiments having no outlet port), such variable relations are not problematic. In such no-flow embodiments, the only operable point in the relation between measured density and volumetric flow is at the vertical axis where volumetric flow is zero. For embodiments that provide fluid flow via an outlet port, however, rate of fluid flow must be either measured (or otherwise be known), or must be controlled to within a certain range about a target operating point. For example, the flow rate can be maintained near zero by providing a small flowrate, as controlled, for example, by a pinhole orifice in the fuel outlet path. Such a low flow rate can facilitate fuel circulation, while maintaining fluid flow near the target operating point (e.g., near zero). Such a rate of fluid flow can be, for example, a flow rate corresponding to a measured differential pressure being within 0.1%, 0.5%, 1%, or 2% of the differential pressure measured for a zero fluid flow rate, for example.

In some embodiments, such as those which will be disclosed below with reference to FIGS. 5 and 6, a measured flow rate is used in the determination of density of the aircraft fuel. For example, using a known relation between differential pressure and fluid flow and/or pump speed, accurate determination of aircraft fuel density can be determined based on impeller speed, measured flow rate, and measured differential pressure. Various ways of determining such accurate determinations of aircraft fuel density can be performed using such measured metrics, as will be described below.

Figure 4:
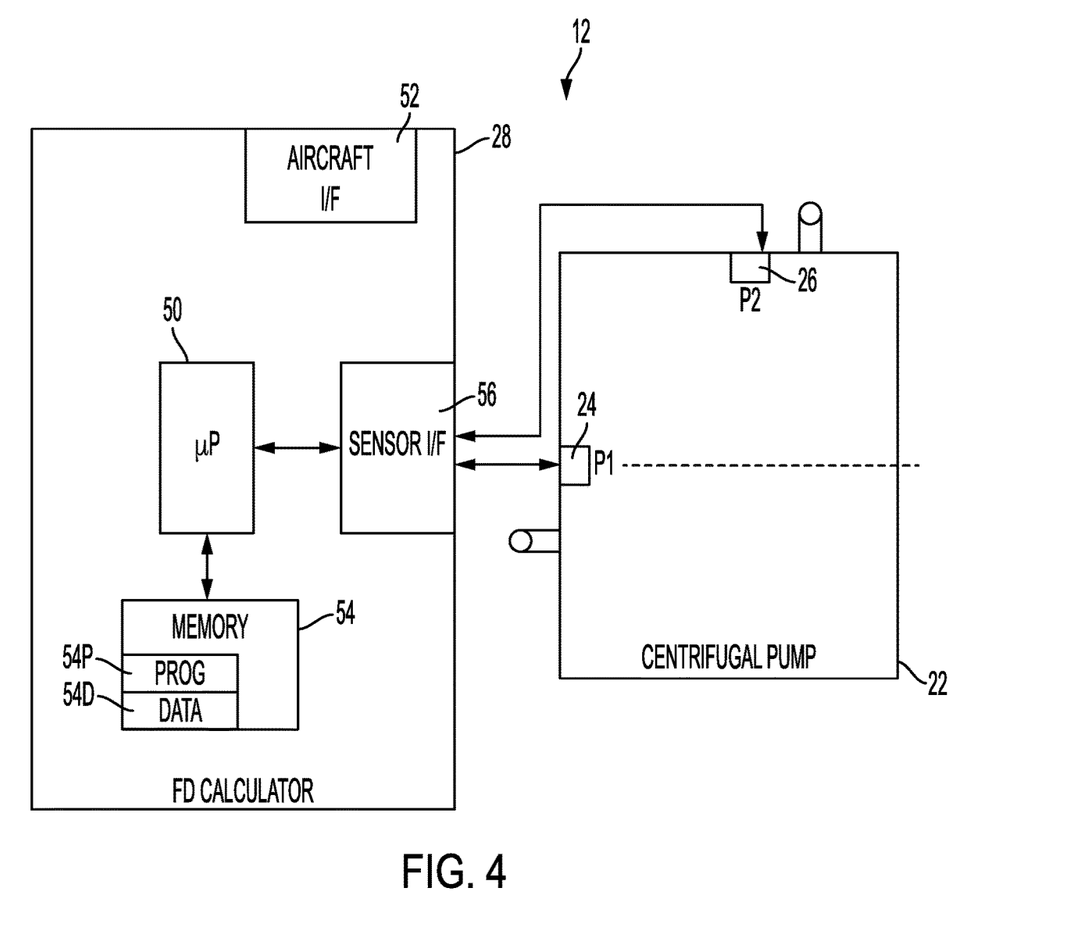
FIG. 4 is a block diagram of fuel system that simultaneously pumps and measures density of aircraft fuel using a single impeller.

FIG. 4 is a block diagram of fuel system that simultaneously pumps and measures density of aircraft fuel using a single impeller. In FIG. 4, fuel system 12 includes centrifugal pump 22, first and second pressure sensors 24 and 26, and fuel density calculator 28. Fuel density calculator 28 includes processor(s) 50, aircraft interface 52, and storage device(s) 54, and sensor interface 56. Processor(s) 50 can receive program instructions 54P from storage device(s) 54. Processor(s) 50 can be configured to calculate fuel density, based on received pressure sensor signals and on program instructions 54P. For example, processor(s) 50 can be configured to receive pressure sensor signals, via sensor interface 56, indicative of measured fuel pressures $P_1$ and $P_2$. Processor(s) 50 can calculate fuel density based on the received pressure sensor signals and provide the calculated density to other aircraft systems via aircraft interface 52.

As illustrated in FIG. 4, fuel density calculator 28 includes processor(s) 50, aircraft interface 52, storage device(s) 54, and sensor interface 56. However, in certain examples, fuel density calculator 28 and/or fuel system 12 can include more or fewer components. For instance, in some embodiments, fuel system 12 can include a tachometer configured to measure a rotational velocity of the impeller and/or a rotational flow measurement sensor. The rotational velocity of the impeller as measured by a tachometer, can be indicative of the rotational frequency of the aircraft fuel. In some embodiments, fuel density calculator can include a flow regulator configured to regulate, based at least in part on the calculated fuel density, fuel flow of the aircraft fuel. In some examples, fuel density calculator 28 can be performed in one of various aircraft computational systems, such as, for example, an existing Full Authority Digital Engine Controller (FADEC) of the aircraft.

Processor(s) 50, in one example, is configured to implement functionality and/or process instructions for execution within fuel density calculator 28. For instance, processor(s) 50 can be capable of processing instructions stored in storage device(s) 54. Examples of processor(s) 50 can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) 50 can be configured to perform fuel density calculations.

Storage device(s) 54 can be configured to store information within fuel density calculator 28 during operation. Storage device(s) 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device (s) 54 is a temporary memory, meaning that a primary purpose of storage device(s) 54 is not long-term storage. Storage device(s) 54, in some examples, is described as volatile memory, meaning that storage device(s) 54 do not maintain stored contents when power to Fuel density calculator 28 is turned off. Examples of volatile memories can include random access memories (RAM), dynamic random access memories (DRAM), static random access memories (SRAM), and other forms of volatile memories. In some examples, storage device(s) 54 is used to store program instructions for execution by processor(s) 50. Storage device(s) 54, in one example, is used by software or applications running on fuel density calculator 28 (e.g., a software program implementing fuel density calculation).

Storage device(s) 54, in some examples, can also include one or more computer-readable storage media. Storage device(s) 54 can be configured to store larger amounts of information than volatile memory. Storage device(s) 54 can further be configured for long-term storage of information. In some examples, storage device(s) 54 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 52 can be used to communicate information between fuel density calculator 28 and an aircraft. In some embodiments, such information can include aircraft conditions, flying conditions, and/or atmospheric conditions. In some embodiments, such information can include data processed by fuel density calculator 28, such as, for example, alert signals. Aircraft interface 52 can also include a communications module. Aircraft interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Figure 5:
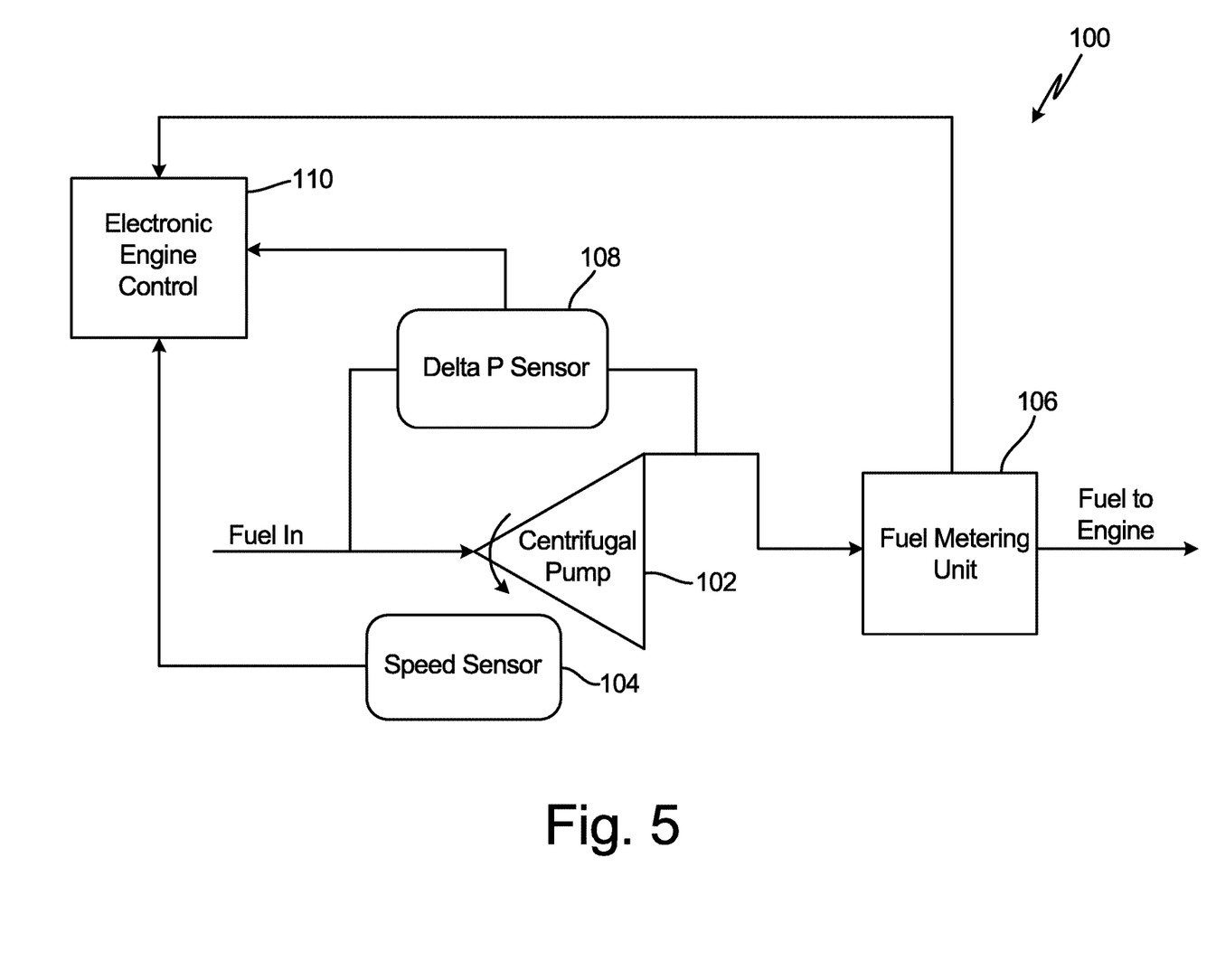
FIG. 5 is a schematic diagram of a fuel system that simultaneously pumps fuel and measures fuel density based on a manufacturer's head-curve relation.
Figure 6:
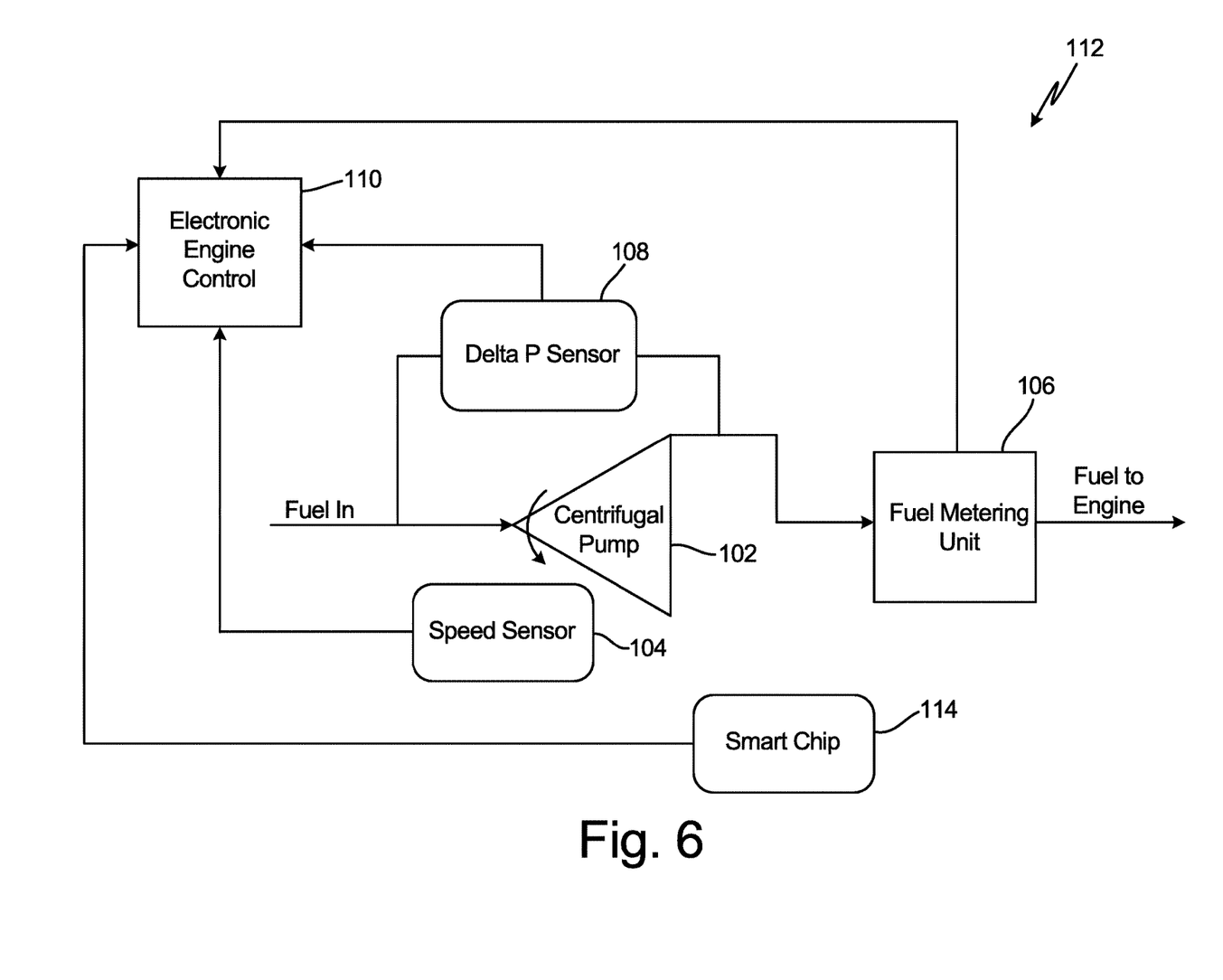
FIG. 6 is a schematic diagram of a fuel system that simultaneously pumps fuel and measures fuel density based on a head-curve relation determined by calibration.

FIG. 5 is a schematic diagram of a fuel system that simultaneously pumps fuel and measures fuel density based on a manufacturer's head-curve relation. In FIG. 5, fuel system 100 includes centrifugal pump 102, speed sensing arrangement 104, flow-rate sensing arrangement 106, pressure sensing arrangement 108, and processor 110. Centrifugal pump 102 includes an impeller (not depicted) configured to pump the aircraft fuel. Speed sensing arrangement 104 is configured to determine a rotational frequency of the impeller while the centrifugal pump is pumping the aircraft fuel. Flow-rate sensing arrangement 104 is configured to measure flow rate of the aircraft fuel through centrifugal pump 102. Pressure sensing arrangement 108 is configured to measure pressure at two different points within or across centrifugal pump 102 or a differential pressure between the two different points while centrifugal pump 102 is pumping the aircraft fuel. Processor 110 is configured to calculate a density of the aircraft fuel based on the manufacturer's head-curve relation. The manufacturer's head-curve relation relates a normalized differential pressure to the rotational frequency and the flow rate. The normalized differential pressure is the differential pressure divided by the fluid density. Using this head-curve relation along with the differential pressure, the rotational frequency, and the flow rate, the fluid density can be determined.

Fuel system 100 depicted in FIG. 5 can determine a fluid density using a head-curve relation pertaining to the specific centrifugal pump 102, using the measured parameters of differential pressure, impeller rotational frequency, and fluid flow rate. For example, measurements of impeller speed, fluid flow rate, and differential pressure can be provided as inputs, and a density of the fluid can be calculated using the head-curve relation pertaining to centrifugal pump 102. These measured inputs can be used to calculate a theoretical fluid density using the head-curve relation that relates such measured inputs to fluid density, such as, for example, a manufacturer-provided head-curve relation. In some embodiments, temperature of the fluid being pumped by centrifugal pump 102 can be measured and used in addition to the above cited measurement inputs for determining the fluid density.

In other embodiments, an empirically-determined head-curve relation can be used, one that is calibrated for the specific centrifugal pump 102 used for each aircraft. The specific head-curve relation determined during a calibration phase and such measured input parameters can be used to determine aircraft fuel density. FIG. 6 is a schematic diagram of a fuel system that simultaneously pumps fuel and measures fuel density based on a head-curve relation determined by such a calibration step. In FIG. 6, fuel system 112 includes centrifugal pump 102, speed sensing arrangement 104, flow-rate sensing arrangement 106, pressure sensing arrangement 108, processor 110, and computer-readable memory 114, which contains data indicative of an empirically-determined head-curve relation that is specific to centrifugal pump 102. Centrifugal pump 102 includes an impeller (not depicted) configured to pump the aircraft fuel. Speed sensing arrangement 104 is configured to determine a rotational frequency of the impeller while the centrifugal pump is pumping the aircraft fuel. Flow-rate sensing arrangement 104 is configured to measure flow rate of the aircraft fuel through centrifugal pump 102.

Pressure sensing arrangement 108 is configured to measure pressure at two different points within or across centrifugal pump 102 or a differential pressure between the two different points while centrifugal pump 102 is pumping the aircraft fuel. Processor 110 is configured to calculate a density of the aircraft fuel based on the calibrated head-curve relation. The calibrated head-curve relation relates a normalized differential pressure to the rotational frequency and the flow rate of the aircraft fuel. The normalized differential pressure is the differential pressure divided by the fluid density. Using this calibrated head-curve relation along with the differential pressure, the rotational frequency, and the flow rate, the fluid density can be determined.

Computer-readable memory 114 can be used to store data indicative of the calibrated head-curve relation. Computer-readable memory 114 can be a smart card, for instance, which can contain data indicative of the empirically-determined head-curve relation specifically pertaining to centrifugal pump 102. The calibrated head-curve relation can define a relation between density of the aircraft fuel and flow rate, speed, and either the pressures of two different points within or across centrifugal pump 102 or a differential pressure between such two different points. In the FIG. 6 embodiment, the differential pressure is measured across centrifugal pump 102 between an input port and an output port.

Using the empirical data that characterizes the head-curve relation pertaining to centrifugal pump 102 can provide accurate density determinations regardless of the flow rate of the aircraft fuel. Such head-curve relations can be determined during a characterization or calibration phase of fuel system 100. For example, during installation or maintenance of fuel system 100, a head-curve relation can be empirically determined. Such empirical head-curve relations can be tabulated as look-up tables, cubic spline curves, tables, etc.

Empirically determining the head-curve relation of a centrifugal pump can be performed during an installation phase, during a maintenance phase, or during a calibration phase, for example. In some embodiments, a fuel system that simultaneously pumps and measures density of aircraft fuel using a single impeller, such as fuel system 12 depicted in FIG. 4 can be used to empirically determine the head-curve relation of centrifugal pump 22. For example, fluids of various densities can be pumped at various flow rates using various rotational frequencies. The pressures of these various fluids can be measured at the two different points. These data—the measured pressures, flow rates, rotational frequencies, and known fluid densities can be used to determine the specific head-curve relation corresponding to or characterizing centrifugal pump 22. Processor(s) 50 can receive the measured pressures, flow rates, rotational frequencies, and known fluid densities and use these to determine a specific head-curve relation that characterized centrifugal pump 22. In other embodiments, a pump characterization system can be used to determine the head-curve relation of centrifugal pump 22.

Discussion of Possible Embodiments

The following are non-exclusive descriptions of possible embodiments of the present invention.

Some embodiments relate to a system for simultaneously pumping and measuring density of an aircraft fuel. The system includes a centrifugal pump including an impeller configured to pump the aircraft fuel. The system includes a speed sensing arrangement configured to determine a rotational frequency of the impeller while the centrifugal pump is pumping the aircraft fuel. The system includes a flow-rate sensing arrangement configured to measure flow rate of the aircraft fuel through the centrifugal pump. The system includes a pressure sensing arrangement configured to measure pressure at two different points within or across the centrifugal pump or a differential pressure between the two different points while the centrifugal pump is pumping the aircraft fuel. The system includes one or more processors. The system also includes computer-readable memory containing data indicative of a empirically-determined head-curve relation corresponding to the centrifugal pump and determined during a characterization phase. The head-curve relation defines a relation between density of the aircraft fuel and flow rate, speed, and either the pressures of the two different points or the differential pressure between the two different points. The computer-readable memory further containing instructions that, when executed by the one or more processors, cause the system to calculate, using the empirically-determined head-curve relation during an operation phase, a density of the aircraft fuel based on the rotational frequency, the flow rate, and either the pressures of the two different points or the differential pressure between the two different points.

The system of the preceding paragraph can optionally include, additionally and/or alternatively, any one or more of the following features, configurations and/or additional components:

A further embodiment of the foregoing system, wherein the computer-readable memory can further contain instructions that, when executed by the one or more processors, cause the system to empirically determine, during a characterization phase, the head-curve relation corresponding to the centrifugal pump. The empirically determined head-curve relation relates density of the aircraft fuel to flow rate of the aircraft fuel, pressure of the aircraft fuel as sensed at two different points within or across the centrifugal pump, and rotational frequency of an impeller of the centrifugal pump. The computer-readable memory can further contain instructions that, when executed by the one or more processors, cause the system to store data indicative of the head-curve relation empirically determined.

A further embodiment of any of the foregoing systems, wherein the computer-readable memory can include a smart card containing the empirically-determined head-curve relation corresponding to the centrifugal pump.

A further embodiment of any of the foregoing systems, wherein the flow-rate sensing arrangement can include a fuel metering unit configured to meter the aircraft fuel to an aircraft engine, wherein the fuel metering unit includes the flow-rate sensing arrangement.

A further embodiment of any of the foregoing systems, wherein the fuel metering unit can include a flow regulator configured to regulate, based at least in part on the calculated fuel density, fuel flow of the aircraft fuel.

A further embodiment of any of the foregoing systems, wherein the pressure sensing arrangement measures the differential pressure between inlet and outlet ports of the centrifugal pump.

A further embodiment of any of the foregoing systems can further include a temperature sensor configured to measure the temperature of the aircraft fuel pumped by the centrifugal pump. The processor can be configured to calculate a density of the aircraft fuel further based on the measured temperature of the aircraft fuel pumped by the centrifugal pump.

A further embodiment of any of the foregoing systems, wherein the impeller can be an open vane impeller.

A further embodiment of any of the foregoing systems, wherein the impeller can be a semi-open vane impeller.

A further embodiment of any of the foregoing systems, wherein the impeller can be a closed vane impeller.

A further embodiment of any of the foregoing systems, wherein the rotational frequency of the impeller can be indicative of a rotational frequency of the aircraft fuel about the impeller axis.

A further embodiment of any of the foregoing systems, wherein the speed sensing arrangement can include a tachometer configured to measure a rotational frequency of the impeller. The rotational frequency can be indicative of the rotational frequency of the aircraft fuel.

A further embodiment of any of the foregoing systems, wherein centrifugal pump can be an axial flow pump.

A further embodiment of any of the foregoing systems, wherein centrifugal pump can be a radial flow pump.

Some embodiments relate to a method for simultaneously pumping and measuring density of aircraft fuel. The method includes empirically determining, during a characterization phase, a head-curve relation that characterizes a centrifugal pump. The empirically determined head-curve relation relates density of the aircraft fuel to flow rate of the aircraft fuel, pressure of the aircraft fuel as sensed at two different points within or across the centrifugal pump, and rotational frequency of an impeller of the centrifugal pump. The method includes storing data indicative of the head-curve relation empirically determined. The method includes pumping, during an operational phase, the aircraft fuel with the centrifugal pump. The method includes measuring, during the operational phase, the flow rate of the aircraft fuel pumped by the centrifugal pump. The method includes measuring, during the operational phase, pressure at the two different points or a differential pressure between the two different points. The method includes measuring during the operational phase, a rotational frequency of the impeller of the centrifugal pump. The method includes retrieving, from computer-readable memory, the data indicative of the empirically-determined head-curve relation. The method also includes calculating during the operational phase, a density of the aircraft fuel based on the rotational frequency, the flow rate, and the pressures of the two different points or the differential pressure between the two different points.

The method of the preceding paragraph can optionally include, additionally and/or alternatively, any one or more of the following features, configurations and/or additional components:

A further embodiment of the foregoing method, wherein the computer-readable memory can include a smart card containing the empirically-determined head-curve relation corresponding to the centrifugal pump.

A further embodiment of any of the foregoing methods, wherein measuring flow rate of the aircraft fuel pumped by the centrifugal pump can include measuring pressure across the centrifugal pump, the measured pressure across the centrifugal pump indicative of the flow rate of the aircraft fuel.

A further embodiment of any of the foregoing methods, wherein the pressure across the centrifugal pump can be a differential pressure between inlet and outlet ports of the centrifugal pump.

A further embodiment of any of the foregoing methods can further include measuring temperature of the aircraft fuel in the centrifugal pump. Calculating a density of the aircraft fuel can be further based on the measured temperature of the aircraft fuel in the centrifugal pump.

A further embodiment of any of the foregoing methods, wherein centrifugal pump can be a radial flow pump.

A further embodiment of any of the foregoing methods, wherein centrifugal pump is an axial flow pump.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for simultaneously pumping and measuring density of an aircraft fuel, the system comprising:
    a centrifugal pump including an impeller configured to pump the aircraft fuel;
    a speed sensing arrangement configured to determine a rotational frequency of the impeller while the centrifugal pump is pumping the aircraft fuel;
    a flow-rate sensing arrangement configured to measure flow rate of the aircraft fuel through the centrifugal pump;
    a pressure sensing arrangement configured to measure pressure at two different points within or across the centrifugal pump or a differential pressure between the two different points while the centrifugal pump is pumping the aircraft fuel;
    one or more processors; and
    computer-readable memory containing data indicative of a empirically-determined head-curve relation corresponding to the centrifugal pump and determined during a characterization phase, the head-curve relation defining a relation between density of the aircraft fuel and flow rate, speed, and either the pressures of the two different points or the differential pressure between the two different points, the computer-readable memory further containing instructions that, when executed by the one or more processors, cause the system to:
        calculate, using the empirically-determined head-curve relation during an operation phase, a density of the aircraft fuel based on the rotational frequency, the flow rate, and either the pressures of the two different points or the differential pressure between the two different points.

2. The system of claim 1, wherein the computer-readable memory further containing instructions that, when executed by the one or more processors, cause the system to:
    empirically determine, during a characterization phase, the head-curve relation corresponding to the centrifugal pump, the empirically determined head-curve relation relating density of the aircraft fuel to flow rate of the aircraft fuel, pressure of the aircraft fuel as sensed at two different points within or across the centrifugal pump, and rotational frequency of an impeller of the centrifugal pump; and
    store data indicative of the head-curve relation empirically determined.

3. The system of claim 1, wherein the computer-readable memory includes a smart card containing the empirically-determined head-curve relation corresponding to the centrifugal pump.

4. The system of claim 1, wherein the flow-rate sensing arrangement comprises:
    a fuel metering unit configured to meter the aircraft fuel to an aircraft engine, wherein the fuel metering unit includes the flow-rate sensing arrangement.

5. The system of claim 4, wherein the fuel metering unit comprises:
    a flow regulator configured to regulate, based at least in part on the calculated fuel density, fuel flow of the aircraft fuel.

6. The system of claim 1, wherein the pressure sensing arrangement measures the differential pressure between inlet and outlet ports of the centrifugal pump.

7. The system of claim 1, further comprising:
    a temperature sensor configured to measure the temperature of the aircraft fuel pumped by the centrifugal pump,
    wherein the processor is configured to calculate a density of the aircraft fuel further based on the measured temperature of the aircraft fuel pumped by the centrifugal pump.

8. The system of claim 1, wherein the impeller is an open vane impeller.

9. The system of claim 1, wherein the impeller is a semi-open vane impeller.

10. The system of claim 1, wherein the impeller is a closed vane impeller.

11. The system of claim 1, wherein the rotational frequency of the impeller is indicative of a rotational frequency of the aircraft fuel about the impeller axis.

12. The system of claim 1, wherein the speed sensing arrangement comprises:
    a tachometer configured to measure a rotational frequency of the impeller, the rotational frequency being indicative of the rotational frequency of the aircraft fuel.

13. The system of claim 1, wherein centrifugal pump is a radial flow pump.

14. A method for simultaneously pumping and measuring density of aircraft fuel, the method comprising:
    empirically determining, during a characterization phase, a head-curve relation that characterizes a centrifugal pump, the empirically determined head-curve relation relating density of the aircraft fuel to flow rate of the aircraft fuel, pressure of the aircraft fuel as sensed at two different points within or across the centrifugal pump, and rotational frequency of an impeller of the centrifugal pump;
    storing data indicative of the head-curve relation empirically determined;
    pumping, during an operational phase, the aircraft fuel with the centrifugal pump;
    measuring, during the operational phase, the flow rate of the aircraft fuel pumped by the centrifugal pump by a flow-rate sensing arrangement;
    measuring, during the operational phase, pressure at the two different points or a differential pressure between the two different points by a pressure sensing arrangement;
    measuring during the operational phase, a rotational frequency of the impeller of the centrifugal pump by a speed sensing arrangement;

retrieving, from computer-readable memory, the data indicative of the empirically-determined head-curve relation; and calculating during the operational phase, a density of the aircraft fuel based on the rotational frequency, the flow rate, and the pressures of the two different points or the differential pressure between the two different points.

15. The method of claim 14, wherein the computer-readable memory includes a smart card containing the empirically-determined head-curve relation corresponding to the centrifugal pump.

16. The method of claim 14, wherein measuring flow rate of the aircraft fuel pumped by the centrifugal pump comprises:

measuring pressure across the centrifugal pump, the measured pressure across the centrifugal pump indicative of the flow rate of the aircraft fuel.

17. The method of claim 16, wherein the pressure across the centrifugal pump is a differential pressure between inlet and outlet ports of the centrifugal pump.

18. The method of claim 14, further comprising:

measuring temperature of the aircraft fuel in the centrifugal pump, wherein calculating a density of the aircraft fuel is further based on the measured temperature of the aircraft fuel in the centrifugal pump.

19. The method of claim 14, wherein centrifugal pump is a radial flow pump.

* * * * *